United States Patent [19]

Jameson et al.

[11] 4,455,474

[45] Jun. 19, 1984

[54] THERMALLY INSULATED ELECTRICALLY HEATED HOSE FOR TRANSMITTING HOT LIQUIDS

[75] Inventors: Calvin R. Jameson, Atlanta; Robert G. Baker, Buford, both of Ga.

[73] Assignee: Nordson Corporation, Amherst, Ohio

[21] Appl. No.: 325,389

[22] Filed: Nov. 27, 1981

[51] Int. Cl.³ .................. H05B 3/58; F16L 11/12; F16L 53/00; B67D 5/62
[52] U.S. Cl. ............................ 219/301; 137/341; 138/33; 174/47; 219/308; 219/522; 222/146 HE
[58] Field of Search ............... 219/301, 298, 299, 522, 219/547, 307, 308; 222/146 HE, 146 R, 146 H; 137/341; 138/33, 127, 149; 174/47

[56] References Cited

U.S. PATENT DOCUMENTS

| | | | |
|---|---|---|---|
| 2,243,220 | 5/1941 | Pitman | 219/301 X |
| 2,793,280 | 5/1957 | Harvey | 219/301 X |
| 3,019,325 | 1/1962 | Clouse | 219/301 X |
| 3,097,288 | 7/1963 | Dunlap | 219/307 |
| 3,543,803 | 12/1970 | Chrow | 219/301 X |
| 3,585,361 | 6/1971 | Rosen et al. | 219/301 X |
| 3,603,403 | 9/1971 | Horwinski | 219/301 X |
| 3,727,029 | 4/1973 | Chrow | 219/301 |
| 4,194,536 | 3/1980 | Stine et al. | 219/301 X |
| 4,229,613 | 10/1980 | Braum | 174/47 |
| 4,308,519 | 7/1977 | Foucras | 219/301 X |
| 4,323,174 | 4/1982 | Wood | 222/146 HE |

FOREIGN PATENT DOCUMENTS

| | | | |
|---|---|---|---|
| 725162 | 3/1955 | United Kingdom | 219/298 |
| 897292 | 5/1962 | United Kingdom | 219/301 |
| 1120482 | 7/1968 | United Kingdom | 219/301 |

Primary Examiner—Anthony Bartis
Attorney, Agent, or Firm—Wood, Herron & Evans

[57] ABSTRACT

A flexible electrically heated hose for transporting molten adhesive from a melter to a dispenser. The hose comprises a Teflon tube contained within stainless steel braided wire and fitted with conventional hydraulic fittings at each end. The braided tube is encased within a multiple ply covering which includes electrical resistance heating wires and a resistance temperature detector adhered between two plies of helically wound fiberglass tape. This tape is covered by multiple plies of helically wound, double thickness fiberglass paper between the plies of which there are embedded spiral wound electrical leads to the dispenser. The fiberglass paper layer is encased within two layers of helically wound polyester felt, a layer of helically wound vinyl tape, and a braided polyester cover. Hard molded plastic cuffs are attached to the ends of the hose. The electrical leads to the heating wires, temperature detector and dispenser extend radially from the hose through holes in the cuffs. Electrical plug-in adapters are attached to the ends of the electrical leads.

17 Claims, 16 Drawing Figures

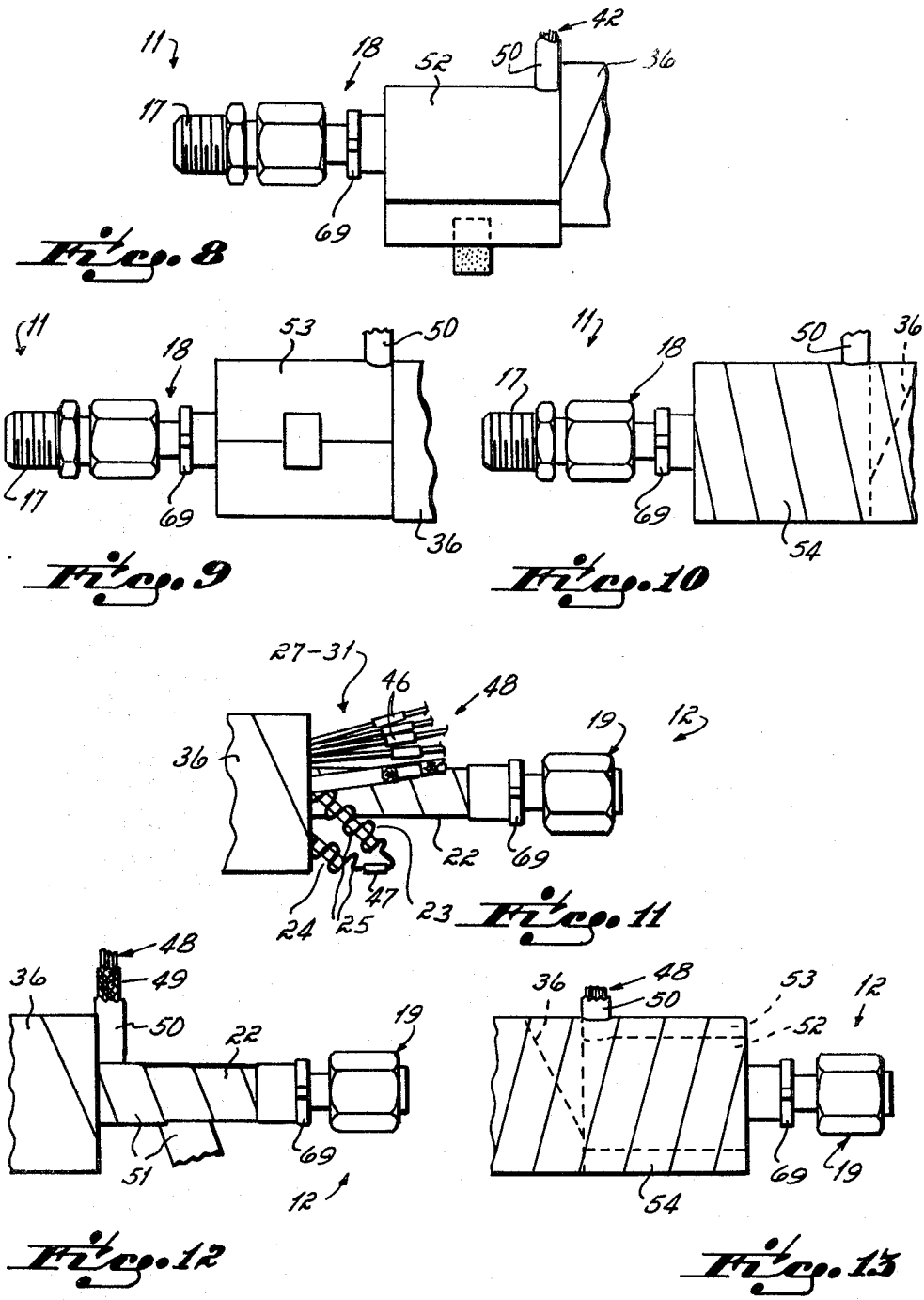

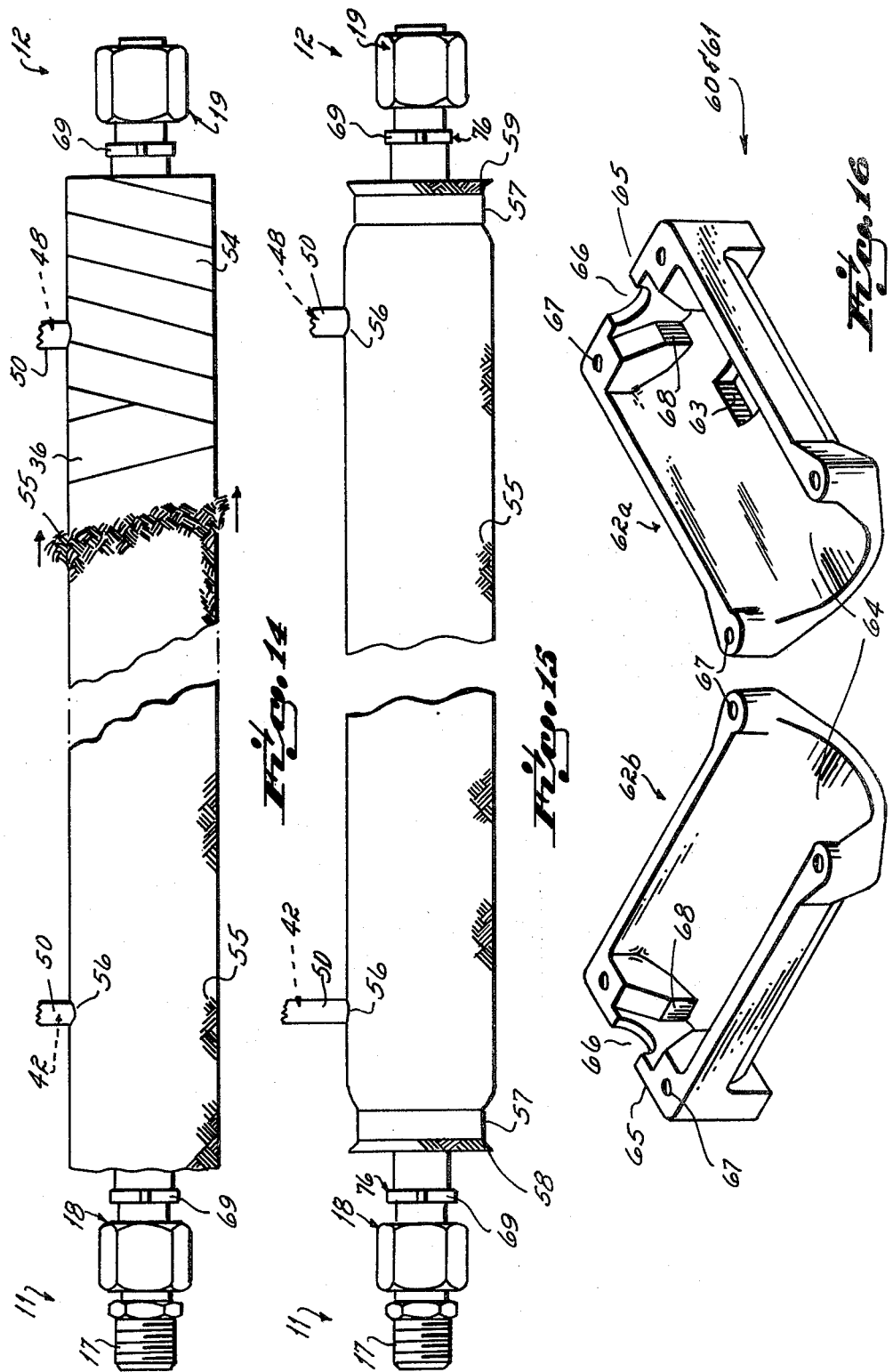

THERMALLY INSULATED ELECTRICALLY HEATED HOSE FOR TRANSMITTING HOT LIQUIDS

This invention relates to heated tubing and more particularly to a heated hose for conveying molten adhesive.

Thermoplastic adhesives or so-called "hot melt" adhesives are now widely used to secure substrates together in a great variety of applications. These hot melt materials are essentially solvent free adhesives which are applied in a molten state and form a bond upon cooling to a solid state. By reason of their quick setting characteristics, their adhesive "tack" and their gap filling properties, they are used in many industrial adhesive applications. For example, such adhesives are now commonly used in the assembly and manufacture of automobiles, furniture, aircraft sub-assemblies and the like. Many of those assembly operations utilize production line techniques wherein the adhesive applicator must be moved by an operator to and around the assembly part during application of the adhesive to the substrate. In such applications the adhesive is quite commonly applied to the substrate by an adhesive hand gun to which the molten adhesive is supplied through a flexible hose. In this type of system the molten feed stock or molten adhesive is converted from the solid state (e.g. pellets, bulk, or chunks) to a molten state by a melter structure such as a melting tank. The molten feed stock is then pumped from the melter structure to a gun or dispenser through a feed hose within which the molten feed stock is maintained at a temperature on the order of 350° F. and a pressure of several hundred pounds per square inch. That feed hose as well as the dispenser gun or hand gun to which the hose supplies the molten feed stock are both commonly heated so as to maintain the feed stock in the molten state when the gun is not being used to dispense material, or to re-melt the feed stock if the gun is shut down for an extended period, i.e., overnight, between shifts, etc.

These feed hoses are handled and quite often come into contact with operators who are handling the dispensing guns to which the hoses are attached. Therefore, the hoses are very well insulated so as to maintain molten material on the inside of the hose at 350° F. and still be only warm to the touch on the outside of the hose. In the past this hose insulation has been subject to failure and it has therefore been an objective of this invention to provide an improved hot melt adhesive dispensing hose which is not subject to insulation degradation and ultimate resulting failure of the hose.

Another problem encountered with prior hot melt adhesive dispensing hoses is the very substantial power requirements required for those hoses to maintain a preset temperature of molten adhesive within the hose. It has, therefore, been another objective of this invention to provide an improved hose which has less thermal heat loss and therefore requires less power to maintain the molten adhesive at a preset temperature within the hose.

Still another objective of this invention has been to provide an improved hose which is less expensive to manufacture than hoses which have been used in the past for transporting hot melt adhesive from a melter to a dispensing gun.

These objectives are achieved and this invention is predicated upon an improved hot melt adhesive distribution hose which comprises a Teflon tube encased within stainless steel braiding. This braided tube has conventional hydraulic swivel fittings secured to its opposite ends. The braided tube is encased within a multiple ply covering which includes electrical heating wires and a temperature sensor adhered between two plies of fiberglass tape. This tape is covered by multiple plies of helically wound, double thickness fiberglass paper between the plies of which there are embedded spiral wound electrical leads which extend the length of the hose and connect a heater and temperature sensor at the gun with the opposite end of the hose. This fiberglass paper layer is then encased within two layers of helically wound polyester felt, a layer of vinyl tape, and a braided polyester cover. The electrical leads within the hose extend radially from one side through two piece molded plastic cuffs attached to each end of the hose. Electrical plug adapters are attached to the ends of the electrical leads so that the electrical leads from the gun and the control system may be plugged into these adapters.

The primary advantage of the invention is that it provides an improved hose which is less subject to failure because of degradation of the insulation of the hose, which is more easily and safely attached to the dispensing gun, and which is less expensive to manufacture than prior art hoses suitable for this application.

These and other objects and advantages of this invention will be more readily apparent from the following description of the drawings in which:

FIGS. 2–15 are side elevational views of sections of the hose illustrating the wrapping sequence employed in the manufacture of the hose of FIG. 1.

FIG. 16 is a perspective view of the two piece cuff attached to each end of the hose of FIG. 1.

Figure 1:
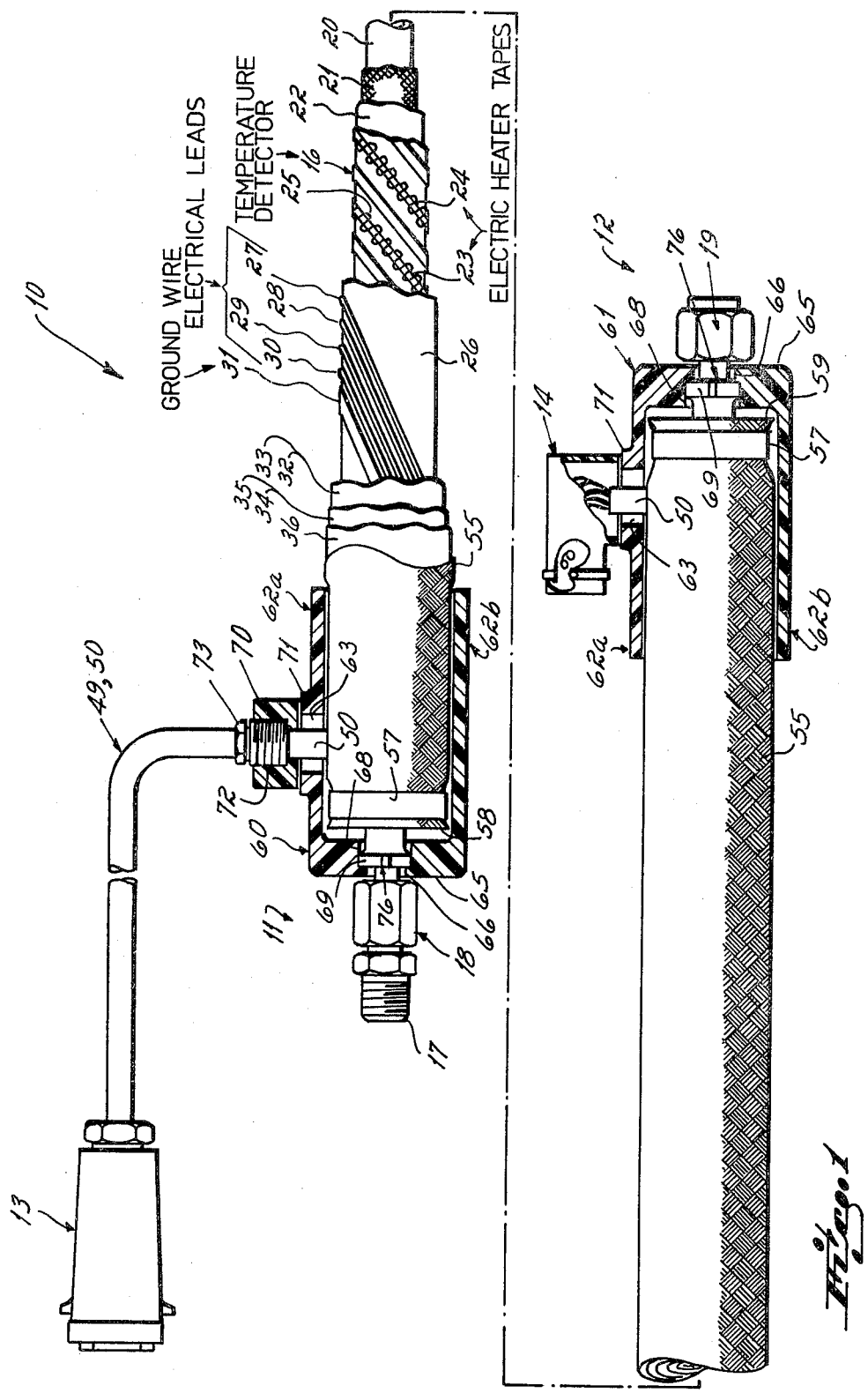
FIG. 1 is a side elevational view partially broken away and partially in cross section of a hot melt adhesive transporting hose incorporating the invention of this application.
Figure 2:
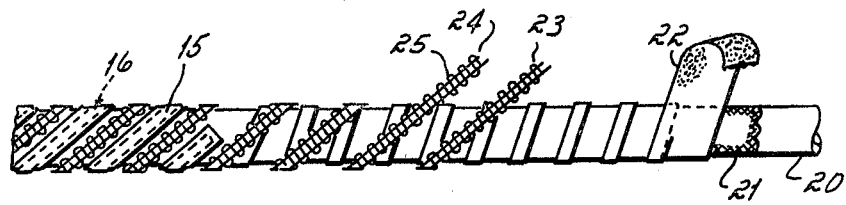
Figure 3:
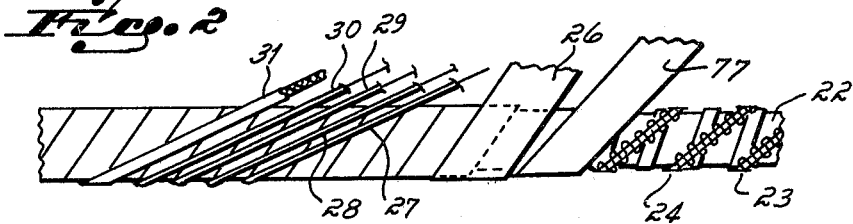
Figure 4:
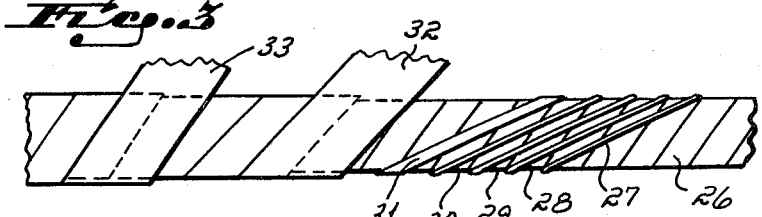

With reference first to FIG. 1 there is illustrated a heated hose 10 for transporting molten thermoplastic material or so-called "hot melt" material from a melter tank (not shown) to a dispensing gun (not shown). The melter tank or source of molten material is intended to be attached to the unit end 11 of the hose and the dispensing gun is intended to be attached to the gun end 12. As explained more fully hereinafter, the unit end 11 of the hose is equipped with an electrical plug 13 which is intended to connect the electrical leads of the hose to a control panel at the melter. Similarly, the gun end 12 of the hose is equipped with an electrical plug 14 for connecting electrical leads contained within the hose to a mating plug connected by electrical leads to electrical components of the gun.

In general, this hose 10 is intended to transport molten adhesive at a pressure of several hundred psi and at a temperature on the order of 250° F.–350° F. while maintaining the material at that temperature. Additionally, the hose is sometimes required to melt material contained within the hose if that material should cool and solidify as it commonly does between shifts or overnight when the dispenser gun with which the hose is utilized is inoperative. To that end the hose includes electrical resistance heaters 23, 24 contained within the hose and extending for the length of the hose. These heaters are covered by insulative material so as to enable the hose to be contacted or touched by the operator of the dispensing gun without any physical harm.

With reference now to FIGS. 2-15, there is illustrated the sequence of operations employed to manufacture the hose 10. This sequence starts with a Teflon tube 20 braided with a stainless steel wire braiding 21. Teflon is chosen for this application because it is one of the few polymeric materials which will withstand the relatively high temperatures at which molten thermoplastic adhesive is maintained as it is pumped from one place to another. However, Teflon will not withstand the relatively high pressures at which this material is usually pumped, i.e. on the order of 200 psi, and therefore the Teflon tube is encased within the stainless steel metal braiding 21.

Extending from each end of the Teflon tube 20 there is a conventional hydraulic female swivel 18 and 19. The swivel 18 at the unit end 11 of the hose is fitted with a threaded male adapter plug 17 so as to enable the fitting to be attached to a conventional hot melt adhesive melting unit.

The braided tube is wrapped with a double-sided fiber-glass electrical tape (FIG. 2) which is helically wrapped in overlapping fashion for the length of the tube 20. The tape 22 is referred to as double-sided because it has thermosetting adhesive on both sides. Consequently, it adheres to the braiding 21 of the tube and to a double wrap of heater tape 23, 24 which is helically wound over the fiberglass tape 22. The heater tapes 23, 24 are conventional commercially purchaseable items which include an electrical resistance heating wire 25 sinusoidally configured within the tape. Located between the two heater tapes 23, 24 at a mid-point in the length of the hose there is a conventional resistance temperature detector RTD 16 helically wrapped about the hose over the double-sided fiberglass tape. The RTD is secured in place with a layer 15 of single-sided electric tape. This temperature detector 16 is helically wound about the hose and is located approximately 18" from the unit end 11 of the hose. Since the RTD is a commercially available item, it has not been described in detail herein.

After application of the heater tapes 23, 24 and the hose resistance temperature detector RTD 16, the tube is wrapped with a single-sided fiberglass electrical tape 77 which is helically wrapped in an overlapping fashion for the length of the tube 20.

After application of the fiberglass tape 77, the tube is helically wrapped with a single ply of double thickness fiberglass paper 26. By overlapping the helically wound paper for half its width, the single ply of paper results in a double thickness of thermal insulative fiberglass paper being applied to the tube.

After application of the fiberglass paper 26, the tube is helically wound with five electrical leads 27, 28, 29, 30 and 31. Four of these leads 27, 28, 29 and 30 are insulated leads and the fifth lead 31 is a braided ground wire which may be covered with an insulative material. Two of the leads 27, 28 are intended to be connected to the heater of the dispensing gun (not shown) and two leads 29, 30 are intended to be connected to the temperature controller of the dispensing gun. The ground wire 31 serves to ground the dispensing gun.

After wrapping of the hose with the electrical leads 27-30 and ground wire 31, the tube is wrapped with two more plies of double thickhess fiberglass paper 32, 33. Again, in order to obtain the double thickness, each ply is 50% overlapped upon itself for the full length of the helical winding of each ply.

The fiberglass paper plies 26, 32 and 33 are all made from a commercially available unwoven fiberglass paper. The material is referred to as unwoven fiberglass paper because it is conventionally manufactured by paper companies on conventional paper making machinery. Consequently, it is an unwoven fiberglass material.

Figure 5:
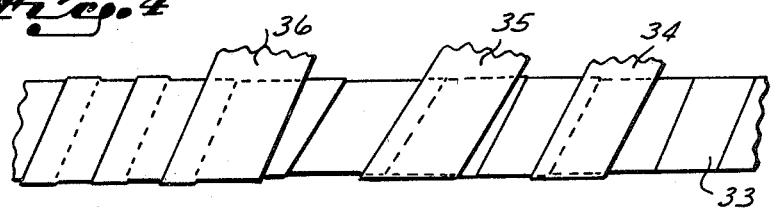

After application of the two plies of fiberglass paper 32, 33, the tube is wrapped for its full length with two plies or wraps of helically wound polyester felt (Fiberdyne E275) 34, 35 (FIG. 5). This double thickness of polyester felt is then followed with a single thickness layer of helically wound vinyl electrical tape 36 which has adhesive upon its underside. This vinyl tape functions as a moisture barrier over the felt.

Figure 6:
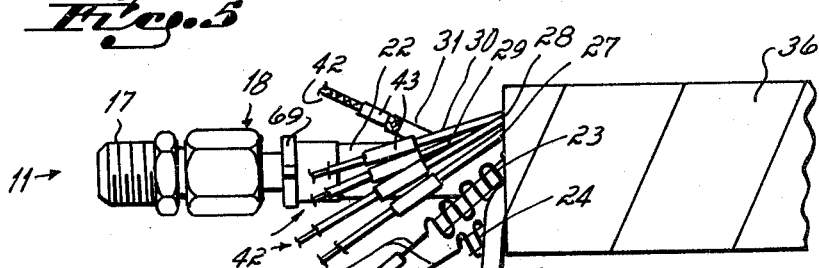
Figure 7:
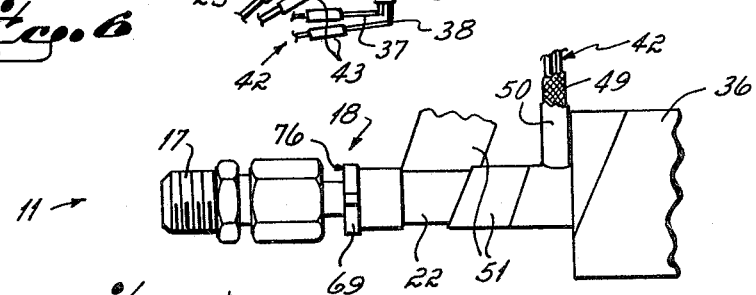

After the tube has been completely wound with the multiple plies hereinbefore described, the insulative material wrapped over the electrical heater tapes 23, 24 is cut away or trimmed back from each end of the hose for approximately three inches (FIGS. 6 and 11). As seen in FIG. 6, this results in approximately three inches of each of the heater tapes 23, 24, the RTD leads 37, 38, and the electrical gun leads 27, 28, 29, 30 and 31 being exposed for approximately three inches at each end of the hose. The electrical wire within each of these leads is then exposed by cutting away of the insulation over the ends of the leads. At the unit end of the hose the exposed wire of the electrical leads are all connected to the ends of electrical leads 42 by conventional insulated crimped splicers 43. As shown in FIG. 11, the gun end of the hose, the exposed ends of the heating wire 25 within each of the heater tapes 23, 24 are connected together by a crimped splice 47. Interconnecting the ends of the heater tapes 23, 24 enables an electrical circuit to be completed through the tapes with the result that there need be no return wire to make the completed circuit. The exposed ends of the electrical leads 27, 28, 29, 30 and 31 at the gun end of the hose are connected by conventional crimped splicers 46 to electrical leads 48.

The electrical leads 42, 48 at each end of the hose are bundled within a braided fiberglass sleeve 49 covered by a thermoplastic elastomeric tube 50 which extends radially from the side of the hose.

After the leads 42, 48 are encased within the sleeves and tubes 49, 50 the ends of the hose are built up with a multiple ply covering identical to the covering which had been removed to expose the electrical leads and the heated tape. Specifically, the ends of the hose are wrapped with a single sided electrical tape 51 having a thermosetting adhesive on the inside surface thereof followed by three plies of double thickness fiberglass paper 52, two plies of helically wound polyester felt 53 and a single ply of helically wound vinyl electrical tape 54.

The full length of the hose is then covered with a braided polyester cover 55 having holes 56 through which the bundled electrical leads 42, 48 extend radially from the hose (FIG. 14). Conventional metal bands 57 are then clamped over the ends of the hose so as to clamp the insulative materials in compression within the band. The ends of the insulative material are then trimmed as indicated at 58, 59 in FIG. 15 preparatory to attachment of hard molded plastic cuffs 60, 61 over the ends of the hose.

The two cuffs 60, 61 attached to the opposite ends of the hose 10 are identical and therefore only a single cuff will be described. It should be appreciated though that an identical cuff is attached to both ends of the hose.

With reference to FIG. 16 it will be seen that the cuff 60 comprises two substantially identical halves 62a, 62b which differ only in that one-half 62a is provided with a radial hole 63 through which the bundle of electrical leads contained within sleeve 49 and tube 50 extend. Each half 62a, 62b comprises a semi-circular tubular section 64 having one closed end 65. The closed end has a semi-circular hole 66 in the center such that when the two halves are put together, the semi-circular holes 66 combine to form a circular hole through the otherwise closed end of the cuff. The two halves of the cuff are secured together by four screws (not shown) which extend through four matching holes 67 formed in each half of the cuff.

Formed on the interior of the end walls 65 of each half of the cuff there is preferably a Y-shaped groove 68. When the cuff is assembled over the end of the hose this Y-shaped groove mates with flats 69 (FIG. 1) formed on a hexagonal portion 76 of the swivel fitting 18, 19 so as to prevent the cuff from rotating relative to the hose.

With reference to FIG. 1, it will be seen that the bundle of electrical leads 42 at the unit end of the hose extend through the hole or aperture 63 in the side of the cuff 60. A plastic block 70 having a threaded bore 72 is bolted by conventional fasteners (not shown) to a boss 71 formed on the side of the cuff surrounding the aperture 63. Within the threaded bore 72 of this block there is a threaded nut through which the bundle of electrical leads extend. A nut 73 is compressed over the bundle of leads and a grommet (not shown) contained internally of the nut frictionally secures the nut to the sleeve 49 and tubing 50 surrounding the bundle of leads so as to prevent the bundle of leads from being pulled radially from the hose 10.

The outer end of the tube 50 containing the bundle of electrical leads extends into a conventional commercially available electrical plug 13. This plug has multiple pins adapted to be received within pins of the control section of a melter unit so as to electrically connect the leads of the hose to the electrical leads of the control unit.

On the gun end 12 of the hose 10 the cuff 61 is secured against rotation relative to the hose by engagement of flats of the Y-shaped slot 68 with flats 69 on the hexagonal shaped section 76 of the hydraulic fitting 19. The tube 50 containing the electrical leads at the gun end of the hose extends through the hole 63 in the cuff 61. Mounted upon the boss 71 surrounding the aperture 63 there is a conventional commercially available electrical plug 14 to pins of which the leads 48 contained within the tube 50 are connected. This plug is attached to the cuff by conventional screws or threaded connectors (not shown). The plug preferably is of the type which has a rotatable cam attached to it and adapted to cooperate with a cam surface of a mating plug so as to secure a mating plug to the plug 14. The plug 14 is adapted to receive the mating plug of a flexible electrical lead from the dispenser gun to which the gun end of the hose is intended to be connected. Such a lead would connect the leads 27–31 of the hose with a heater, temperature controlled element, and ground contained within the gun.

The primary advantage of the hose hereinabove described is that it is less subject to failure than presently available commercial hoses suited for similar applications. It is also much less costly to manufacture than presently available hoses for such application. This hose also has the advantage of being more easily connected to thermoplastic melters and dispensing guns than most hoses available for this purpose.

While we have described only a single preferred embodiment of our invention, persons skilled in this art will appreciate changes and modifications which may be made without departing from the spirit of our invention. Therefore, we do not intend to be limited except by the scope of the following claims:

We claim:

1. A flexible heated hose of substantially uniform construction throughout its length for transmitting hot liquid material comprising,
    a flexible polymeric tube contained within a braided stainless steel covering, said tube having metallic hydraulic fittings sealingly attached to its opposite ends,
    a first layer of woven fiberglass helically wound around said braided stainless steel covering, said first layer being coated on its opposite sides with a thermosetting adhesive,
    at least one electrical heating line helically wound around and adhered to said first layer of woven fiberglass,
    electrical leads for supplying electrical power to said at least one electrical heating line,
    temperature detecting means adhesively secured to said first layer of woven fiberglass, and electrical leads helically wrapped around said first layer of woven fiberglass and extending from said temperature detecting means to one end of said hose,
    a second layer of woven fiberglass helically wound over said at least one electrical heating line, said temperature detecting means, and said temperature detecting means leads, said second layer of woven fiberglass being coated on the inside surface with a thermosetting adhesive so as to secure said at least one electrical heating line, temperature detecting means and temperature detecting means leads against movement relative to said tube,
    a third layer of fiberglass paper helically wound over said second layer, said third layer acting as a thermal barrier to heat loss from said hose,
    at least two electrical leads helically wrapped around said third layer of fiberglass paper and extending for the length of said hose, said at least two electrical leads being operative to transmit electrical power for the length of said hose,
    a fourth layer of at least one thickness of fiberglass paper helically wrapped over said at least two electrical leads, said fourth layer acting as a thermal barrier to heat loss from said hose,
    a fifth layer of at least one thickness of polyester felt helically wrapped over said fourth layer,
    a sixth layer of vinyl electrical tape helically wrapped over said fifth layer, said sixth layer providing a moisture barrier for said hose, and
    a braided polyester cover over said sixth layer.

2. The hose of claim 1 which further includes a metal band compressively secured around the ends of said hose over said braided polyester cover.

3. The hose of claim 2 which further includes a molded plastic cuff secured over each end of said hose, each of said cuffs having an opening in one side of said cuff, and the ends of said electrical leads extending through said fourth, fifth, and sixth layers, through said braided polyester cover, and through said opening in each of said cuffs.

4. The hose of claim 3 which further includes electrical plugs attached to the ends of said electrical leads.

5. The hose of claim 1 in which said polymeric tube is made from Teflon.

6. A flexible heated hose of substantially uniform construction throughout its length for transmitting hot liquid material comprising, a flexible polymeric tube contained within a braided metal covering, said tube having hydraulic fittings sealingly attached to its opposite ends, a first layer of woven fiberglass tape helically wound around said braided metal covering, said first layer being coated on its opposite sides with an adhesive, at least one electrical heating line helically wound around and adhered to said first layer of woven fiberglass, electrical leads for supplying electrical power to said at least one electrical heating line, temperature detecting means adhesively secured to said first layer of woven fiberglass, and electrical leads helically wrapped around said first layer of woven fiberglass tape and extending from said temperature detecting means to one end of said hose, a second layer of woven fiberglass tape helically wound over said at least one electrical heating line, said temperature detecting means, and said temperature detecting means leads, said second layer of woven fiberglass tape being coated on the inside surface with an adhesive so as to secure said at least one electrical heating line, temperature detecting means and said temperature detection means leads against movement relative to said tube, a third layer of fiberglass paper helically wound over said second layer, said third layer acting as a thermal barrier to heat loss from said hose, at least two electrical leads helically wrapped around said third layer of fiberglass paper and extending for the length of said hose, said at least two electrical leads being operative to transmit electrical power for the length of said hose, a fourth layer of at least one thickness of fiberglass paper helically wrapped over said at least two electrical leads, said fourth layer acting as a thermal barrier to heat loss from said hose, a fifth layer of at least one thickness of polyester felt helically wrapped over said fourth layer, a sixth layer of vinyl electrical tape helically wrapped over said fifth layer, said sixth layer providing a moisture barrier for said hose, and a braided polyester cover over said sixth layer.

7. The hose of claim 6 which further includes a metal band compressively secured around the ends of said hose over said braided polyester cover.

8. The hose of claim 7 which further includes a molded plastic cuff secured over each end of said hose, each of said cuffs having an opening in one side of said cuff, and the ends of said electrical leads extending through said fourth, fifth and sixth layers, through said braided polyester cover, and through said opening in each of said cuffs.

9. The hose of claim 8 which further includes electrical plugs attached to the ends of said electrical leads.

10. The hose of claim 6 in which said polymeric tube is made from Teflon.

11. A flexible heated hose of substantially uniform construction throughout its length for transmitting hot liquid material comprising, a flexible polymeric tube contained within a braided metal covering, said tube having hydraulic fittings sealingly attached to its opposite ends, a first layer of woven fiberglass tape helically wound around said braided metal covering, said first layer being coated on its opposite sides with an adhesive, at least one electrical heating line helically wound around and adhered to said first layer of woven fiberglass, electrical leads for supplying electrical power to said at least one electrical heating line, temperature detecting means adhesively secured to said first layer of woven fiberglass, and electrical leads helically wrapped around said first layer of woven fiberglass tape and extending from said temperature detecting means to one end of said hose, a second layer of woven fiberglass tape helically wound over said at least one electrical heating line, said temperature detecting means, and said temperature detecting means leads, said second layer of woven fiberglass tape being coated on the inside surface with an adhesive so as to secure said at least one electrical heating line, temperature detecting means and said temperature detecting means leads against movement relative to said tube, a third layer of at least one ply of fiberglass paper helically wound over said second layer, said third layer of fiberglass paper acting as a thermal barrier to heat loss from said hose, a fourth layer of at least one ply of polyester felt helically wrapped over said third layer, a fifth layer of vinyl electrical tape helically wrapped over said fourth layer, said fifth layer providing a moisture barrier for said base, and a braided polyester cover over said fifth layer.

12. The hose of claim 11 which further includes a metal band compressively secured around the ends of said hose over said braided polyester cover.

13. The hose of claim 12 which further includes a molded plastic cuff secured over each end of said hose, at least one of said cuffs having an opening in one side of said cuff, and the ends of said electrical leads extending through said third, fourth and fifth layers, through said braided polyester cover, and through said opening in said cuff.

14. The hose of claim 13 which further includes an electrical plug attached to said ends of said electrical leads.

15. The hose of claim 11 in which said polymeric tube is made from Teflon.

16. Ths hose of claim 11 in which said third layer comprises at least two plies of double thickness fiberglass paper.

17. The hose of claim 11 in which said fourth layer comprises at least two plies of polyester felt.

* * * * *